United States Patent [19]

Dresty, Jr. et al.

[11] 4,363,722

[45] Dec. 14, 1982

[54] PROCESS AND APPARATUS FOR TREATING TITANIUM MACHINING SCRAP

[75] Inventors: John E. Dresty, Jr., Glastonbury; Eugene M. Klein, West Hartford, both of Conn.

[73] Assignee: Suisman & Blumenthal, Incorporated, Hartford, Conn.

[21] Appl. No.: 221,563

[22] Filed: Dec. 31, 1980

[51] Int. Cl.³ .................................................. B07B 15/00
[52] U.S. Cl. ........................................ 209/3; 209/40; 209/44; 209/44.1; 209/589; 241/24
[58] Field of Search ............... 209/3, 12, 40, 44, 44.1, 209/446–469, 589; 241/19, 24, DIG. 38

[56] References Cited

U.S. PATENT DOCUMENTS

| | | | |
|---|---|---|---|
| 3,053,388 | 9/1962 | Tittle | 209/589 X |
| 3,606,946 | 9/1971 | Zenz et al. | 209/10 |
| 3,610,415 | 10/1971 | Deak | 209/446 |
| 3,865,629 | 2/1975 | Dankoff et al. | 209/3 X |
| 3,905,556 | 9/1975 | Drage | 209/44 X |
| 3,917,947 | 11/1975 | Fenton | 209/589 X |

FOREIGN PATENT DOCUMENTS

| | | | |
|---|---|---|---|
| 2432898 | 4/1980 | France | 209/589 |
| 1266694 | 3/1972 | United Kingdom | 241/24 |
| 698656 | 11/1979 | U.S.S.R. | 209/589 |

OTHER PUBLICATIONS

Instruction Manual, Model S22G Stoner, Triple/s Dynamics, Dallas, Tex., Nov. 1976.
Stoner Model S–22G, Triple/s Dynamics, Dallas, Tex., Aug. 1977.
"Dry Separations for the Processing Industries", Triple/s Dynamics, Dallas Tex., Jul. 1980.

Primary Examiner—Ralph J. Hill
Attorney, Agent, or Firm—McCormick, Paulding & Huber

[57] ABSTRACT

A process and apparatus is disclosed for treating titanium machining scrap to remove both magnetic and non-magnetic high density inclusions, particularly bits or pieces of tungsten carbide broken from the cutting tool or tools associated with the scrap. In the process and apparatus a major portion of the undesired high density inclusions are removed by the novel use of an air separator, particularly one having an inclined, vibrating, air-conducting deck onto which the work product is fed and through which an upward current of air is blown. One or more magnetic separators are also used in advance of a final x-ray inspection station. The overall efficiency of the process and apparatus is such that a high percentage of initial input material is converted to high quality material passing the x-ray inspection and suitable for use in making rotating aircraft parts or other parts subjected to severe service demands.

14 Claims, 2 Drawing Figures

PROCESS AND APPARATUS FOR TREATING TITANIUM MACHINING SCRAP

BACKGROUND OF THE INVENTION

This invention relates to a process and apparatus for treating metal scrap to remove undesired inclusions prior to being melted, and deals more particularly with such process and apparatus specifically directed to the removal of both magnetic and non-magnetic tungsten carbide bits, and other magnetic and non-magnetic high density inclusions, from titanium machining scrap.

Titanium is a relatively expensive metal having a number of properties such as light weight, corrosion resistance, heat resistance, toughness and strength which make it the preferred structural material in many severe applications. For example, it is presently used widely in making rotating parts of aircraft engines, and other critical parts of aircraft, the failure of which could be disasterous. The material in question may be either commercially pure titanium or any one of a family of titanium based alloys, and as used herein and in the claims which follow the word "titanium" is intended to likewise refer to either such commercially pure titanium or any such titanium based alloy.

Titanium ingots from which parts are made are conventionally produced by electric arc furnaces using consumable titanium electrodes in inert atmospheres. The electrodes themselves may be made in various different ways and may contain both virgin and scrap titanium.

The titanium scrap used in electrode making is commonly divided into two different kinds. One of these kinds of scrap is referred to as "solid" scrap and consists of relatively large solid pieces of titanium such as the waste remaining after cutting desired pieces from titanium sheets, plates, rods, bars or the like. Since these scrap pieces are solid and relatively large it is easy to reliably separate from them pieces of foreign material which might contaminate the resulting melt. These solid scrap pieces are generally fastened to one another by welding or bundling to form electrodes or electrode portions.

The other kind of scrap used in electrode making is referred to herein as "machining" scrap, and is also sometimes broadly referred to as "turnings" scrap. It consists of the pieces produced by a machining operation, such as the chips produced by a milling or drilling operation or the turnings produced by a lathe cutting operation. Usually such pieces are small, but in the case of lathe turnings their size can vary widely and they are often of a curly or bushy form. In using machining scrap for electrodes it is briquetted, either by itself or in mixture with virgin or sponge titanium, and a number of briquettes are then welded or otherwise fastened together to complete each electrode.

Because of its properties, titanium is conventionally machined using tungsten carbide cutting tools and, due to the severity of the cutting procedure, it is not unusual for these cutting tools to fail or partially fail in service by having bits or pieces of their material break or flake away and fall into the scrap receptacle along with the scrap produced by the tool. These bits of tungsten carbide material which enter the scrap by breaking from cutting tools, and other similar high density pieces of foreign material such as stones which may possibly become inadvertently mixed with the scrap material, are highly undesirable in titanium scrap recycled into consumable electrodes. The reason for this is that when the electrodes are melted the tungsten carbide bits, and many other similar high density inclusions, unless of a very small size, do not melt at the temperature prevailing in the arc furnace and end up as weakening or failure-inducing anomalies in the parts made from the melt. Obviously, such weak points cannot be tolerated in rotating aircraft engine parts and other parts with severe service requirements and therefore scrap expected to evolve into such parts must be free of such non-melting inclusions.

Some tungsten carbide alloys used for cutting tools are fairly magnetic, and bits of such material can usually be reliably separated from titanium machining scrap with magnetic separators. However, other tungsten carbide alloys are non-magnetic or only slightly magnetic, and heretofore no process or apparatus has been known for reliably and efficiently removing bits of such low magnetic or non-magnetic tungsten carbide from machining scrap. Often it is impossible to assure that a given quantity of machining scrap contains no low magnetic or non-magnetic tungsten carbide inclusions, or other low magnetic or non-magnetic high density inclusions, and therefore the use of such machining scrap in making electrodes, at least those electrodes intended to be made into high quality parts, has often been prohibited and it has had to be used or sold as a downgraded material of considerably less monetary value than scrap known to be free of high density inclusions.

As used herein the term "free of tungsten carbide and similar high density inclusions" means free of such inclusions larger than a given size. Very small size pieces of tungsten carbide or similar high density materials, such as pieces smaller than 0.015 inch, melt or disintegrate in the arc furnace and cause no failure problems in the end products. Therefore, machining scrap can be taken to be free of high density inclusions even though it may contain particles of high density material smaller than 0.015 inch or smaller than some other specified small size.

The general object of this invention is, therefore, to provide a process and apparatus for efficiently treating titanium machining scrap to produce a scrap product reliably free of tungsten carbide bits and similar high density inclusions and suitable for use in titanium melts intended for making high quality or severe service parts such as the rotating parts of aircraft engines.

Another more specific object of the invention is to provide a cost-efficient process and apparatus, such as aforesaid, for treating titanium machining scrap to remove tungsten carbide bits and other high density inclusions and which process and apparatus are substantially more effective than any process or apparatus previously proposed for the same purpose, especially in its ability to remove non-magnetic or low magnetic inclusions as well as more highly magnetic inclusions.

Other objects and advantages of the invention will become apparent from the following description and associated drawing describing a preferred embodiment of the invention.

As described hereinafter, the process and apparatus of the invention include the use of an air separator of the type referred to by some as a "stoner" and by others as a "destoner". That is, the term "stoner" and the term "destoner" are used interchangeably in the art to refer to the same type of apparatus. For convenience, applicants have chosen to use the term "stoner" in the following description and in the claims, but it should be understood that for each usage of the term "stoner" appearing in the description and claims the term "destoner" may be used with equal effect.

SUMMARY OF THE INVENTION

This invention resides in a process and apparatus for treating titanium machining scrap to enhance its value by reliably removing from it tungsten carbide bits and similar high density inclusions likely to cause points of weakening in parts fabricated from melts using the scrap. An important part of the invention is the use in the process and apparatus of a stoner (or destoner) type air separator for separating the work product into a rejected "heavy" product consisting of a small fraction of the material fed to the separator and containing most all of the undesired high density inclusions, and a "light" product passed on for further processing.

The invention also resides in steps and means for crushing, washing and sizing the work product before presentation to the stoner so that the stoner receives as its input material washed and dried particulate material with its pieces falling within a narrow prescribed size range. Magnetic separator means or steps may also be included to aid in removing magnetic inclusions, and a final x-ray inspection station is used to check for the presence of residual inclusions and to reject portions of the work material including such inclusions.

More specifically, the invention further resides in the stoner used in the process, or forming part of the apparatus, having an air-conducting deck, which is inclined in its longitudinal direction only and vibrated generally in the direction of its incline, to which the input material is fed and through which an upward current of air is blown with the result that the "heavy" pieces of the material are conveyed upwardly to the upper edge of the deck under the influence of its vibration while the "light" pieces become relatively more disassociated from the surface of the deck and move toward the deck's lower end.

DETAILED DESCRIPTION OF THE PREFERRED EMBODIMENT

Figure 1:
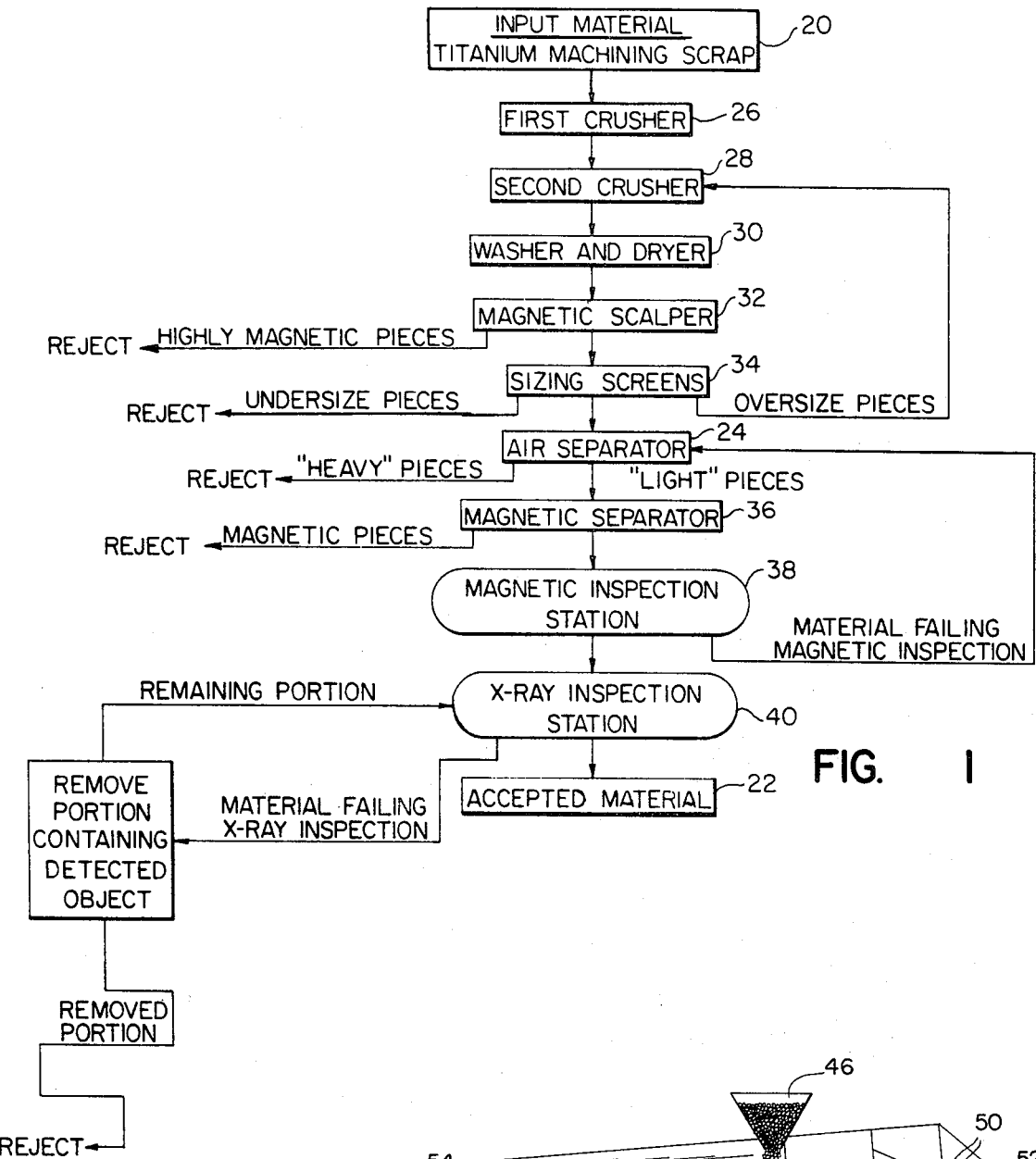
FIG. 1 is a block diagram showing an apparatus embodying this invention.

Turning to the drawing, the components making up an apparatus or system according to a preferred embodiment of the invention, and which performs the inventive process, are shown. This apparatus treats an input material, indicated at 20, consisting of titanium machining scrap, that is pieces or particles of titanium, usually of small size, produced by a machining process such as lathe turning, milling or drilling. The input scrap is further such as is suspected or known to have been produced through the use of tungsten carbide cutting tools so as to possibly contain small bits or pieces of tungsten carbide, or which is otherwise suspected of containing tungsten carbide bits or similar high density inclusions.

The illustrated apparatus functions to remove all tungsten carbide bits or similar high density bits of foreign matter contained in the input material to produce an accepted material, indicated at 22, free of high density inclusions and therefore suitable for use in melts intended for high quality parts. The individual parts or components of the apparatus may be, and preferably are, set up so that the work material flows automatically from one component to the next, as by providing conveyors between the components or by having the output of one component feed directly into the next one. This, however, is not necessary to the invention and if desired the components of the apparatus may be used at different times with the work material, as to each component, being run as a batch through that component until the entire batch is processed, and then the batch moved to the next component for further processing.

Also, the apparatus illustrated in the drawing may include means for making up the input material 20 as a blend of materials selected from various different sources and for testing such input material to determine its chemistry; and various other means may be provided for checking on and controlling the work material's chemistry at various different points in the apparatus and also after it leaves the apparatus. Such means related to the chemistry of the work material is not, however, important to or part of the invention and therefore has been omitted from the drawing and this description.

A critical component of the apparatus is a stoner type air separator 24 which, as hereinafter described in more detail, operates to separate the material fed to it into "heavy" pieces and "light" pieces. To make this separator effective in reliably separating and removing tungsten carbide bits and other high density inclusions as part of the "heavy" product, the input material 20 is first washed, dried and sized so that the material entering the air separator 24 is in a clean, dry condition free of cutting oil and other surface contaminants and has its particles all falling within a relatively narrow size range. The means for so processing the input material may vary and the individual components of such means may be arranged to operate in various different sequences on the work material, without departing from the invention. In the illustrated case, however, this means comprises, in sequence, a first crusher 26, a second crusher 28, a washer and drier 30, a magnetic scalper 32 and a set of sizing screens 34.

The first crusher 26 is a coarse crusher and is intended primarily to chop or break up the larger pieces, such as long or bushy lathe turning pieces, of the input material 20 into smaller pieces more easily handled by the second crusher 28. As an example, the crusher 26 may be a Model 4800 Crusher made by the American Pulverizer Company of St. Louis, Mo.

The second crusher 28 further reduces in size at least the larger pieces of the material output from the first crusher 26 to produce an output product having its particles of fairly uniform size. Preferably, the pieces presented to the air separator 24 have a size range between approximately 1/16 inch and approximately 5/16 inch and still more preferably these particles fall within a more narrow band of this range, as for example within a band of approximately $\frac{1}{8}$ inch to approximately $\frac{1}{4}$ inch. Therefore, the second crusher 28 is designed or adjusted so that as much as possible of its output falls within the desired range or band of particle size. As an example, this crusher may be a Model WS-40 Crusher made by the American Pulverizer Company of St. Louis, Mo.

The work material leaving the second crusher 28 passes to the washer and drier 30. In this unit the material is first washed with a suitable washing agent such as water and detergent. It is then spin dried in a centrifuge and subsequently heat dried in a final stage. By way of example, the unit 30 may be a "Chip Washer" manufactured and sold by Jenson Fabricating Engineers, Inc., of East Berlin, Conn.

Following the washer and drier 30 the work material is moved in a stream over the magnetic scalper 32 which magnetically attracts and removes from the stream highly magnetic pieces such as pieces of iron or steel which may have become inadvertently mixed with the titanium pieces of the input material. The magnetic scalper 32 may also attract and remove some magnetic tungsten carbide bits from the stream of work material passed thereover. In any event, whatever magnetic pieces are removed from the stream are rejected from the process, as indicated in the figure, and are not included in the material passing to the sizing screen 34. By way of example, the magnetic scalper 32 may be a permanent magnet separator such as manufactured and sold under the model name "Brute" by the Eriez Company of Erie, Pa. Also, the illustrated position of the scalper in the system is its preferred location, but this is not critical and it could be located at some other point.

The sizing screens 34 size the work product leaving the magnetic scalper 32 so as to present only particles falling within a desired size range or band to the air separator 24. As previously mentioned, these sized particles preferably fall within a size range of a minimum particle size of approximately 1/16 inch to a maximum particle size of approximately 5/16 inch and still more preferably the particle size is limited to a more narrow band within this gross range. A presently preferred more limited band of sized particles embraces a minimum particle size of approximately ⅛ inch and a maximum particle size of approximately ¼ inch. To produce accepted particles falling within this preferred band, the sizing screens 34 include one with openings sized to pass particles under approximately ⅛ inch in size and to not pass particles greater than ⅛ inch in size, and a second one with openings sized to pass particles less than approximately ¼ inch in size and to not pass particles greater than approximately ¼ inch in size. The particles passed by the first screen are undersized pieces, that is pieces sized less than approximately ⅛ inch, and are rejected from the process, as indicated. The pieces not passed by the second screen are oversized pieces, that is pieces sized greater than approximately ¼ inch, and are returned to the second crusher for recrushing. The material not passing the first screen and passing the second screen is the accepted work product. Of course, screens with other sized openings may be provided to yield an accepted work product of whatever other product size range may be desired.

The acceptable work product issuing from the sizing screens 34 is fed to the air separator 24, which separates it into "heavy" and "light" pieces or products. The separator 24 is of the type wherein a current of air is blown generally upwardly through the work product to stratify it into a lower stratum containing pieces which are elevated only slightly, if at all, by the air current and into an upper stratum containing pieces elevated a substantially greater amount, and wherein such upper and lower strata are moved laterally relative to one another to effect the desired separation. The pieces making up the lower stratum are the "heavy" pieces which tend to remain in that stratum because of their relatively heavier weight or higher density, and the pieces making up the upper stratum are the "light" pieces which tend to seek that stratum because of their relatively lighter weight or lower density; however, the shape of the pieces also has a slight influence on their degree of elevation and is a minor factor in determining the stratum reached by any given piece. In any event, all, or extremely close to all, of the tungsten carbide bits or similar high density inclusions in the input material fall into the lower stratum and are rejected as part of the "heavy" pieces product. This rejected "heavy" pieces product may also include some titanium pieces, but a unique feature of the air separation process performed by the air separator is that the titanium pieces included in the rejected "heavy" product represents only a small percentage, for example about five percent or less, of the work product supplied to the air separator.

Figure 2:
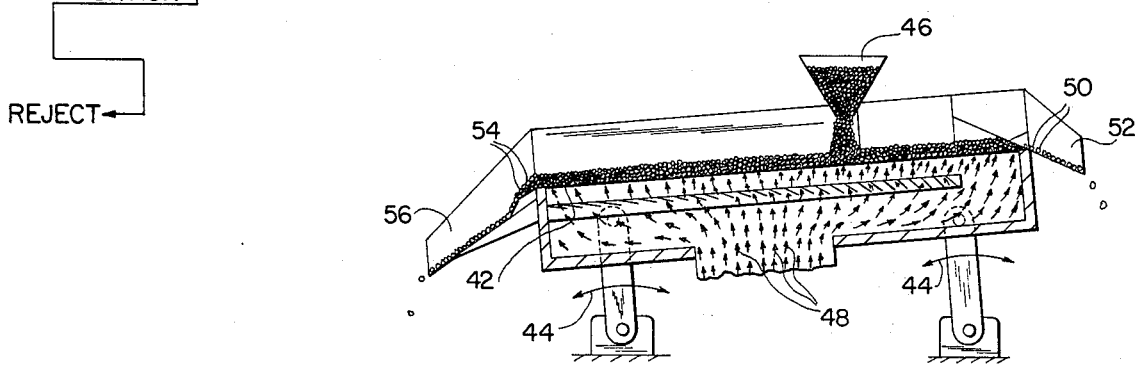
FIG. 2 is a vertical sectional view showing an air separator such as may be used in the apparatus of FIG. 1.

The stoner type air separator 24 more specifically is one, as shown in FIG. 2, having an air-conducting deck 42 inclined in one direction only vibrated generally along the direction of its incline, as indicated by the arrows 44, 44, and having an upper material supporting surface onto which the work product is fed from a feed 46. A current of air, as indicated by the arrows 48, 48, is blown upwardly through the deck and the work product feed rate, deck incline, air current velocity and other variables are set so that work product pieces 50, 50 having densities similar to that of tungsten carbide remain on or close to the deck 42 and are conveyed toward its upper edge, and an associated discharge port 52, by the influence of its vibratory motion and so that lighter weight or less dense work product pieces 54, 54 are lifted a greater distance from the upper surface of the deck 42, thereby becoming more disassociated from the deck's conveying influence and moving toward the lower end of the deck and to a different discharge port 56. By way of example, a suitable air separator for use as the separator 24 illustrated in the drawing is a Model S22G Stoner manufactured by Triple/S Dynamics Supply, Inc. of Dallas, Tex.

Following the air separation process performed by the separator 24, the accepted "light" work product 54 is passed to a magnetic separator 36. This separator is a high intensity electro-magnetic unit over which the work product is fed in a stream, and it acts to magnetically attract and remove from the stream pieces which are slightly magnetic, particularly pieces of titanium carrying small bits of tungsten carbide, as in cases where a small bit of tungsten carbide is stuck to, embedded in or mechanically trapped in a larger piece of titanium. The illustrated position of the magnetic separator 36 is its preferred position in the apparatus and process of this invention. This, however, is not critical and if desired the magnetic separator 36 could be placed ahead of instead of following the air separator 24. Also, in some cases and if desired, the magnetic separator 36, and also possibly the following magnetic inspection station 38, may be omitted from the apparatus and their function omitted from the process, without departing from the broader aspects of the invention. As an example, the separator 36 may be a two pole Model IMR Separator made by the Eriez Company, of Eriez, Pa.

Following the magnetic separator 36 is the magnetic inspection station 38. This station actually is constituted by another magnetic separator, such as another permanent magnet "Brute" separator made by the Eriez Company of Erie, Pa., over which the work product is fed in a stream. Periodically, this separator is inspected by an operator and if it is found to have removed one or more tungsten carbide bits the work product which passed over that separator since its last inspection is considered to have failed its magnetic inspection, it is not accepted, and it is, as illustrated in the drawing, returned to the air separator 24 for further reprocessing by the air separator and the magnetic separator 36.

The work product which acceptably passes the magnetic inspection station 38 is transferred to an x-ray inspection station 40 which performs a final check on it before its becoming part of the accepted material 22. The equipment used at the x-ray inspection station 40 may vary widely. In one possible implementation of the station 40 the work product is processed in batches by spreading quantities of it onto trays which are individually x-rayed to produce either x-ray images on paper or on a fluoroscopic screen. If the image of a tray shows a detected object, that is if it contains a feature possibly representing a tungsten carbide bit or other high density inclusion, the product on that portion of the tray containing the detected object is removed and rejected, as by sucking it up with a vacuum cleaner-type device. The remaining portion of the product on the tray is then returned to the x-ray inspection station 40 for reexamination. Equipment performing in this manner is presently manufactured and sold by X-Ray Products Co., of Pico Rivera, Calif.

In another possible implementation of the x-ray inspection station 40 the work product may be moved in a continuous stream past the inspection station at which it is continuously subjected to x-rays which pass through the stream and which are sensed by a sensor the output of which is automatically interpreted by computer equipment to detect suspected high density inclusions. When a suspected object is so detected, the portion of the stream containing the detected object is automatically removed and rejected, as by a vacuum cleaner-type device. The conveyor for the work product stream is then backed up some distance before proceeding forwardly again so that the work product remaining in the vicinity of the detected and removed object is again re-inspected by the x-ray equipment before becoming part of the accepted material 22. Equipment usable for such an implementation of the x-ray station 40 is available from Inspection Technology, Inc., of Akron, Ohio, and includes a Model 1021 fluoroscopic imaging system.

The x-ray inspection station 40 is very reliable in the final check which it performs on the work material so that the accepted material 22 can with great assurance be taken to be completely free of tungsten carbide bits and similar high density inclusions. When a suspected object is detected at this station a substantial amount of the work product is rejected with the detected object. However, because of the apparatus and processing of this invention which precedes the x-ray inspection, extremely few tungsten carbide bits or other high density inclusions are contained in the work product reaching this inspection so that only a small portion of the work product is rejected at this station and the entire process is made an efficient and cost-effective one.

Although the invention has been described above largely in terms of the components making up the inventive apparatus it should be understood that the invention also resides in the process made up of the various steps performed by these components and which steps are clear from the foregoing discussion and from the drawing and need not be redescribed.

We claim:

1. In a process for treating titanium machining scrap to remove tungsten carbide bits and similar high density inclusions, the improvement comprising the performance at some point in the process of the steps of:
   screening the work material of said process to obtain a quantity of screened pieces substantially all of which screened pieces fall within a given size range,
   performing an air separation operation on said screened pieces to separate them into a "heavy" product and a "light" product, said air separation operation including the substeps of providing a stoner type air separator having an elongated air conducting deck which slopes in its longitudinal direction only, vibrating said deck generally in the direction of its incline, flowing air upwardly through said deck, and feeding said screened pieces onto the upper surface of said deck whereby said screened pieces fed to said deck are stratified into a lower stratum of "heavy" product particles which are conveyed by the vibratory motion of said deck upwardly longitudinally of said deck to the upper end of said deck and an upper stratum of "light" product particles which flow downwardly longitudinally of said deck to the lower end of said deck,
   rejecting from the process the "heavy" product particles which pass over the upper end of said deck, and
   accepting for further treatment in the process the "light" product particles which pass from the lower end of said deck.

2. In a process for treating titanium machining scrap to remove tungsten carbide bits and similar high density inclusions, the improvement as described in claim 1 further characterized by:
   washing the work material of said process at some point in advance of said air separation operation so that the screened pieces supplied to said air separation operation are in a washed condition substantially free of cutting fluid and similar surface contaminants.

3. In a process for treating titanium machining scrap the improvement as described in claim 2 further characterized by:
   drying the work material of said process after said washing step and in advance of said air separation operation so that the screened pieces supplied to said air separation operation are in a washed and dried condition.

4. In a process for treating titanium machining scrap to remove tungsten carbide bits and similar high density inclusions, the improvement as described in claim 1 further characterized by said screening step comprising
   screening the work material of said process at some point in advance of said air separation operation through two screens passing differently sized pieces to divide said work material into undersized pieces, oversized pieces and acceptably sized pieces, said acceptably sized pieces being used as the screened pieces supplied to said air separation operation.

5. In a process for treating titanium machining scrap to remove tungsten carbide bits and similar high density inclusions, the improvement as described in claim 4 further characterized by:
   said two screens having screening openings sized so that substantially all of said acceptably sized pieces fall within a size range of from approximately 1/16 inch to approximately 5/16 inch.

6. In a process for treating titanium machining scrap to remove tungsten carbide bits and similar high density inclusions, the improvement as described in claim 4 further characterized by:

said two screens having screening openings sized so that substantially all of said acceptably sized pieces fall within a size range of from approximately ⅛ inch to approximately ¼ inch.

7. In a process for treating titanium machining scrap to remove tungsten carbide bits and similar high density inclusions, the improvement as described in claim 4 further characterized by:

crushing the work material of said process at some point in advance of said screening operation to in general make smaller and more uniform the size of its pieces.

8. In a process for treating titanium machining scrap to remove tungsten carbide bits and similar high density inclusions, the improvement described in claim 1 further characterized by:

setting the incline of said deck, the velocity of said air and the feed rate of said screened pieces to said upper surface of said deck at such values that those ones of said screened pieces which happen to be bits of tungsten carbide or bits of similar high density material are included in said "heavy" pieces which move toward the upper end of said deck and which are rejected from the process.

9. In a process for treating titanium machining scrap to remove tungsten carbide bits and similar high density inclusions, the improvement described in claim 1, 2, 3, 4, 5, 6, or 7 further characterized by:

performing a magnetic separation operation on the work material of said process to separate said work material into a magnetic product and a non-magnetic product, rejecting said magnetic product from the process, and accepting said non-magnetic product.

10. A process for treating titanium machining scrap to remove tungsten carbide bits and similar high density inclusions, said process comprising the steps of:

providing a quantity of titanium machining scrap, washing and crushing said scrap to obtain a washed and crushed product, screening said washed and crushed product to obtain a sized product having substantially all of its pieces falling within a given size range, performing an air separation operation on said sized product to separate it into a "heavy" product and a "light" product, said air separation operation including the substeps of providing a stoner type air separator having an elongated air conducting deck which slopes in its longitudinal direction only, vibrating said deck generally in the direction of its incline, flowing air upwardly through said deck, and feeding said screened pieces onto the upper surface of said deck whereby said screened pieces fed to said deck are stratified into a lower stratum of "heavy" product particles which are conveyed by the vibratory motion of said deck upwardly longitudinally of said deck to the upper end of said deck and an upper stratum of "light" product particles which flow downwardly longitudinally of said deck to the lower end of said deck, rejecting from the process the "heavy" product particles which pass over the upper end of said deck, and accepting for further treatment in the process the "light" product particles which pass from the lower end of said deck, performing a magnetic separation on said "light" product to separate it into a magnetic product and a non-magnetic product, and performing an x-ray inspection operation on said non-magnetic product to detect and remove therefrom any remaining tungsten carbide bits and similar high density inclusions.

11. An apparatus for treating titanium machining scrap to remove tungsten carbide bits and similar high density inclusions, said apparatus comprising:

a means for crushing and screening a quantity of input titanium machining scrap to produce a sized product having substantially all of its pieces falling within a given size range, a stoner type air separator receiving sized product from said crushing and screening means for separating said sized product into a "heavy" product and a "light" product, said stoner having an elongated air conducting deck which slopes in its longitudinal direction only and which is vibrated generally in the direction of its incline, means for moving air upwardly through said deck, and means for feeding said sized pieces onto the upper surface of said deck, said air separator further being one wherein said sized pieces fed to said deck are stratified into a lower stratum of "heavy" pieces which are conveyed by the vibratory motion of said deck upwardly longitudinally of said deck to the upper end of said deck and an upper stratum of "light" pieces which flow downwardly longitudinally of said deck to the lower end of said deck, and an x-ray inspection mechanism for inspecting the "light" product produced by said air separator and for detecting and removing any remaining tungsten carbide bits and similar high density inclusions remaining in the inspected product.

12. An apparatus for treating titanium machining scrap to remove tungsten carbide bits and similar high density inclusions as defined in claim 11 further characterized by at least one magnetic separator for treating the work product of said apparatus in advance of its reaching said x-ray inspection mechanism to remove magnetic pieces from said work product.

13. An apparatus for treating titanium machining scrap to remove tungsten carbide bits and similar high density inclusions as defined in claim 11 or claim 12 further characterized by a means for washing and drying the work product of said apparatus before its reaching said air separator.

14. An apparatus for treating titanium machining scrap to remove tungsten carbide bits and similar high density inclusions as defined in claim 11 or claim 12 further characterized by said air separator having an inclined, vibrating, air conducting deck with a material supporting upper surface through which a current of air is moved generally upwardly at such a velocity that "heavy" ones of said pieces remain on or close to said upper deck surface and so that "light" ones of said pieces become relatively more disassociated from said upper deck surface and wherein said "heavy" pieces are moved to the upper edge of said deck by the influence of the deck's vibration and the "light" pieces move toward the lower end of said deck.

* * * * *